United States Patent [19]
Takahashi et al.

[11] Patent Number: 5,415,958
[45] Date of Patent: May 16, 1995

[54] VINYLIDENE FLUORIDE COPOLYMER, AND BINDER COMPOSITION CONTAINING THE COPOLYMER FOR NON-AQUEOUS SOLVENT-TYPE SECONDARY BATTERY

[75] Inventors: Yosuke Takahashi; Fujio Suzuki; Takao Iwasaki, all of Iwaki, Japan

[73] Assignee: Kureha Kagaku Kogyo Kabushiki Kaisha, Tokyo, Japan

[21] Appl. No.: 159,567

[22] Filed: Dec. 1, 1993

[30] Foreign Application Priority Data

Dec. 2, 1992 [JP] Japan .................. 4-345141

[51] Int. Cl.⁶ .................................. H01M 4/62
[52] U.S. Cl. .................. 429/217; 526/255; 526/329.4
[58] Field of Search ............ 429/217; 526/255, 329.4

[56] References Cited
U.S. PATENT DOCUMENTS

| | | | |
|---|---|---|---|
| 2,640,862 | 6/1953 | Chubb | 429/217 |
| 2,847,401 | 8/1958 | Gluesenkamp et al. | 526/255 |
| 3,009,980 | 11/1961 | Corren et al. | 429/217 |
| 3,748,295 | 7/1973 | Mikofalvy et al. | 526/255 |
| 4,881,851 | 8/1989 | Miyabayashi et al. | 526/255 |

*Primary Examiner*—Stephen Kalafut
*Attorney, Agent, or Firm*—Wenderoth, Lind & Ponack

[57] ABSTRACT

A vinylidene fluoride copolymer containing a carboxyl group or a carbonate group is formed by copolymerizing a monomer principally comprising vinylidene fluoride with a relatively small amount of an unsaturated dibasic acid monoester or vinylene carbonate. The copolymer has a large adhesion to various substrates or fillers and is excellent in chemical resistance, so that it is useful as a basic substance constituting a binder, an adhesive, a paint, etc. The copolymer is particularly effectively used as a binder for constituting an electrode for a non-aqueous solvent-type secondary battery together with an active substance, or an active substance and an electroconductive material, respectively in a particulate form.

10 Claims, 1 Drawing Sheet

VINYLIDENE FLUORIDE COPOLYMER, AND BINDER COMPOSITION CONTAINING THE COPOLYMER FOR NON-AQUEOUS SOLVENT-TYPE SECONDARY BATTERY

FIELD OF THE INVENTION AND RELATED ART

The present invention relates to a vinylidene fluoride copolymer showing an improved adhesion to a substrate of, e.g., a metal, and an excellent chemical resistance. Such a vinylidene fluoride copolymer is useful in the field of, e.g., binder and paint.

The present invention also relates to a binder composition and an electrode-forming composition for a non-aqueous solvent-type secondary battery, containing such a vinylidene fluoride copolymer.

The present invention further relates to an electrode structure obtained by using such an electrode-forming composition, and a secondary battery including the electrode structure.

Polyvinylidene fluoride resins are excellent in chemical resistance, weatherability and anti-staining characteristic, and have been used not only as a film-forming or shaping material but also as materials for paint and binder. However, a conventional polyvinylidene fluoride resin has a rather poor adhesion to, e.g., a metal substrate and therefore an improved adhesion strength has been desired.

Hitherto, various methods as described below have been proposed for introducing a functional group, such as a carboxyl group, into a fluorine-containing resin so as to provide an improved adhesion to a substrate of, e.g., a metal or an improved solubility in a solvent.

Japanese Laid-Open Patent Application (JP-A) 2-604 discloses a method of opening a ring in an acid anhydride portion of a copolymer of vinylidene fluoride and maleic anhydride with alcohol or water. In this method, however, the copolymer production has to be performed by solution polymerization requiring removal of the solvent, and also the step of reacting the copolymer with alcohol or water is required additionally, thus making the entire process complicated.

JP-A 58-136605 discloses a carboxyl group-containing fluorine-containing polymer obtained by reacting a hydroxyl group-containing fluorine-containing polymer with a dibasic acid anhydride in an organic solvent to convert at least a part of the hydroxyl group into an ester group. Such a fluorine-containing polymer involves a difficulty that the ester bond thereof is liable to be hydrolyzed.

JP-A 56-133309 discloses a method of graft-polymerizing an acrylic monomer onto radiation-exposed skeleton of polyvinylidene fluoride. This method involves a difficulty that it uses a radiation source and requires a facility for administration thereof.

Japanese Patent Publication (JP-B) 52-24959 discloses a method of copolymerizing vinylidene fluoride with acrylic acid, methacrylic acid, etc., in the presence of dialkyl peroxydicarbonate as an initiator in a solvent of a fluorine-containing compound which comprises a $C_1$-$C_4$ saturated hydrocarbon substituted with fluorine or fluorine and chlorine. The use of a fluorine-containing compound as the solvent requires an environmental consideration and careful removal of the solvent, thus complicating the entire process.

Vinylidene fluoride has a poor copolymerizability with a carboxyl group containing monomer, and particularly almost no example has been known regarding copolymerization of these monomers in an aqueous system. For example, a mixture of vinylidene fluoride and a monobasic acid such as acrylic acid or crotonic acid, or a dibasic acid such as maleic acid or citraconic acid, does not cause copolymerization but can only result in homopolymers of the constituent monomers at best, under ordinary polymerization conditions.

SUMMARY OF THE INVENTION

An object of the present invention is to provide a vinylidene fluoride copolymer which shows good adhesion to a substrate of, e.g., a metal, is excellent in chemical-resistance and can be produced by polymerization in an aqueous system.

Another object of the present invention is to provide a binder composition and an electrode-forming composition for a non-aqueous solvent-type secondary battery, containing such a vinylidene fluoride copolymer together with a solvent therefor.

A further object of the present invention is to provide an electrode structure obtained by using such an electrode-forming composition, and a non-aqueous solvent-type secondary battery including the electrode structure.

According to our study, it has been found that a vinylidene fluoride copolymer comprising a relatively small amount of a specific monomer having a carboxylic group or a carbonate group and a monomer principally comprising vinylidene fluoride, can be produced by copolymerization in an aqueous system. It has also been found that the vinylidene fluoride copolymer shows a remarkably improved adhesion to a substrate such as that of a metal compared with a vinylidene fluoride polymer having no carboxylic group or carbonate group introduced thereinto, and satisfactorily retains an excellent chemical resistance a vinylidene fluoride polymer inherently has.

More specifically, according to the present invention, there is provided a vinylidene fluoride copolymer obtained by copolymerizing (a) 100 wt. parts of a monomer comprising at least 80 wt. % of vinylidene fluoride and (b) a polar monomer selected from 0.1–3 wt. parts of a dibasic acid monoester and 0.1–5 wt. parts of vinylene carbonate.

According to another aspect, the vinylidene fluoride copolymer is characterized by a content of the introduced polar group, i.e., carbonyl group or carbonate group. Thus, according to the present invention, there is also provided a vinylidene fluoride copolymer, comprising: a copolymer of (a) a monomer comprising at least 80 wt. % of vinylidene fluoride and (b) a polar monomer selected from the group consisting of unsaturated dibasic acid monoesters and vinylene carbonate; said vinylidene fluoride copolymer having a carbonyl group content of $1 \times 10^{-5}$–$5 \times 10^{-4}$ mol/g, or a carbonate group content of $2 \times 10^{-5}$–$6 \times 10^{-4}$ mol/g.

According to another aspect of the present invention, there is provided a binder composition, comprising: a vinylidene fluoride copolymer as described above, and a solvent capable of dissolving the vinylidene fluoride copolymer.

According to another aspect of the present invention, there is provided an electrode-forming composition for a non-aqueous solvent-type secondary battery, comprising:

a vinylidene fluoride copolymer as described above,
a solvent capable of dissolving the vinylidene fluoride copolymer, and
a particulate active substance, or a particulate active substance and an electroconductive material.

According to another aspect of the present invention, there is provided an electrode structure for a non-aqueous solvent-type secondary battery, comprising: an electroconductive substrate and a composite electrode layer disposed on at least one surface of the electroconductive substrate; said composite electrode layer comprising a particulate active substance, or a particulate active substance and an electroconductive material, and
a binder comprising a vinylidene fluoride copolymer as described above.

According to another aspect of the present invention, there is provided a non-aqueous solvent-type secondary battery, comprising, a positive electrode, a negative electrode, and a separator and a non-aqueous electrolytic solution disposed between the positive and negative electrodes;

at least one of said positive and negative electrodes comprising an electrode structure as described above.

These and other objects, features and advantages of the present invention will become more apparent upon a consideration of the following description of the preferred embodiments of the present invention taken in conjunction with the accompanying drawing.

DETAILED DESCRIPTION OF THE INVENTION

Figure 1:
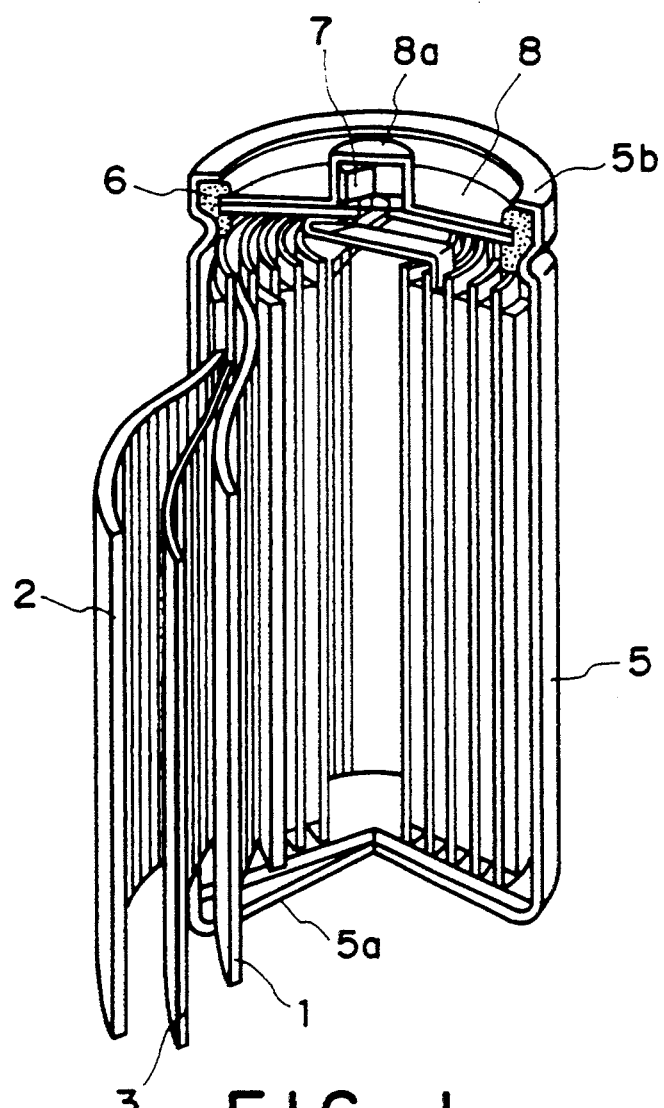
FIG. 1 is a partially exploded perspective view of a non-aqueous solvent-type secondary battery which can be constituted according to the invention.

The monomer comprising at least 80 wt. % of vinylidene fluoride may include vinylidene fluoride alone, and a mixture of vinylidene fluoride and another monomer, examples of which may include: fluorine-containing monomers and hydrocarbon-type monomers, such as ethylene and propylene, respectively copolymerizable with vinylidene fluoride. Examples of the fluorine-containing monomers copolymerizable with vinylidene fluoride may include: vinyl fluoride, trifluoroethylene, trifluorochloroethylene, tetrafluoroethylene, hexafluoropropylene, and fluoroalkyl vinyl ethers. Such another monomer copolymerizable with vinylidene fluoride may preferably be used in a proportion not exceeding 20 wt. % of the total of vinylidene fluoride and such another monomer in view of a balance between solubility in a solvent and solvent-resistance characteristic of the resultant copolymer.

The above-mentioned monomer principally comprising vinylidene fluoride (hereinafter referred to as "vinylidene fluoride-based monomer") may be copolymerized with an unsaturated dibasic acid ester which may preferably have 5-8 carbon atoms, or vinylene carbonate. Examples of such unsaturated dibasic acid monoesters may include: maleic acid monomethyl ester, maleic acid monoethyl ester, citraconic acid monomethyl ester, and citraconic acid monoethyl ester. It is particularly preferred to use maleic acid monomethyl ester or citraconic acid monomethyl ester.

The copolymerization of a vinylidene fluoride-based monomer with an unsaturated dibasic acid monoester or vinylene carbonate (which may be hereinafter sometimes inclusively referred to as a "polar monomer") may be performed by suspension polymerization, emulsion polymerization, solution polymerization, etc. In order to allow easy post treatment, however, it is preferred to perform suspension polymerization or emulsion polymerization in an aqueous medium, particularly aqueous suspension polymerization.

In such suspension polymerization using water as a dispersion medium, it is possible to use a suspension aid, such as methyl cellulose, methoxylated methyl cellulose, propoxidized methyl cellulose, hydroxyethyl cellulose, hydroxypropyl cellulose, polyvinyl alcohol, polyethylene oxide or gelatin in a proportion of 0.005-1.0 wt. %, preferably 0.01-0.4 wt. %, based on the water.

It is possible to use a polymerization initiator, such as diisopropyl peroxydicarbonate, dinormalpropyl peroxydicarbonate, dinormalheptafluoropropyl peroxydicarbonate, isobutyryl peroxide, di(chlorofluoroacyl) peroxide, or di(perfluoroacyl) peroxide. Such a polymerization initiator may be used in a proportion of 0.1-5 wt. %, preferably 0.5-2 wt. %, of the total monomer amount (i.e., total amount of the vinylidene-fluoride-based monomer and the polar monomer).

It is also possible to add a chain transfer agent, such as ethyl acetate, methyl acetate, acetone, ethanol, n-propanol, acetaldehyde, propylaldehyde, ethyl propionate, or carbon tetrachloride, so as to control the polymerization degree of the resultant copolymer. The addition amount thereof may be ordinarily 0.1-5 wt. %, preferably 0.5-3 wt. %, of the total monomer amount.

The monomers may be charged in such an amount as to provide a weight ratio of the total monomer amount to water in the range of 1:1-1:10, preferably 1:2-1:5. The polymerization may be performed at a temperature of 10°-50° C. for 10-100 hours.

By suspension polymerization as described above, it is possible to easily copolymerize the vinylidene fluoride-based monomer and the polar monomer.

The amount to be charged of the polar monomer (i.e., an unsaturated dibasic acid monoester or vinylene carbonate) copolymerized with the vinylidene fluoride-based monomer may be determined in consideration of factors, such as the adhesiveness, chemical resistance, molecular weight and polymerization yield of the resultant copolymer.

According to the present invention, it is preferred to copolymerize 0.1-3 wt. parts, particularly 0.3-2 wt. parts, as charged, of the dibasic acid monoester with 100 wt. parts of the vinylidene fluoride-based monomer. Below 0.1 wt. part, it is impossible to obtain a copolymer showing a sufficient effect of polar group introduction, such as the adhesion to a metal substrate, etc. On the other hand, the addition in excess of 3 wt. parts is liable to provide a copolymer showing a lower chemical resistance. For similar reasons, the resultant vinylidene fluoride copolymer may preferably have a carbonyl group content of $1 \times 10^{-5}$-$5 \times 10^{-4}$ mol/g.

In the case of using vinylene carbonate as a co-monomer, it is preferred to copolymerize 0.1-5 wt. parts, particularly 0.3-3 wt. parts, as charged, of vinylene carbonate with 100 wt. parts of the vinylidene fluoride-based monomer. Below 0.1 wt. part, it is impossible to obtain a copolymer showing a sufficient effect of polar group introduction, such as the adhesion to a metal substrate, etc. On the other hand, the addition in excess of 5 wt. parts is liable to provide a copolymer showing a lower chemical resistance. For similar reasons, the resultant vinylidene fluoride copolymer may preferably have a carbonate group content of $2\times10^{-5}$–$6\times10^{-4}$ mol/g.

The thus-obtained vinylidene fluoride copolymer according to the present invention may preferably show a solution viscosity (herein meaning a logarithmic viscosity number at 30° C. of a solution of 4 g-resin in 1 liter of N,N-dimethylformamide) in the range of 0.5–2.0, particularly 0.8–1.5.

Because of the excellent chemical resistance and adhesion to a substrate of a metal, etc., the vinylidene fluoride copolymer according to the present invention may suitably be used as a material for a paint, a lining material, a binder, etc. In order to provide a form suitable for application adapted to such purposes, it is preferred to form a paint or a binder composition by dissolving 100 wt. parts of the vinylidene fluoride copolymer in 500–2000 wt. parts of a solvent capable of dissolving the copolymer. Preferred examples of such a solvent may include polar solvents, such as N-methyl-2-pyrrolidone, N,N-dimethylformamide, N,N-dimethylacetamide, and dimethylsulfoxide.

Hereinbelow, description will be made on the use of the vinylidene fluoride copolymer according to the invention as a binder for making an electrode for a cell.

In a non-aqueous solvent-type secondary battery using an organic or non-aqueous electrolytic solution such as a lithium secondary battery, it has been practiced to enlarge the electrode area by providing a thin layer of active substance in order to compensate for a low performance under a heavy load due to a low electroconductivity of the non-aqueous electrolytic solution.

FIG. 1 is a partially exploded perspective view of a lithium secondary battery as an embodiment of a non-aqueous solvent-type secondary battery according to the present invention.

More specifically, the secondary battery basically includes a laminate structure including a positive electrode 1, a negative electrode 2 and a separator 3 disposed between the positive and negative electrodes 1 and 2 and comprising a fine porous film of a polymeric material, such as polyethylene or polypropylene, impregnated with an electrolytic solution. The laminate structure is wound in a vortex shape to form an electricity-generating element which is housed within a metal casing 5 having a bottom constituting a negative electrode terminal 5a. In the secondary battery, the negative electrode 2 is electrically connected to the negative electrode terminal 5a, and the uppermost portion of the battery is constituted by disposing a gasket 6 and a safety valve 7 covered with a top plate 8 having a projection constituting a positive electrode terminal 8a electrically connected to the positive electrode. Further, the uppermost rim 5b of the casing 5 is crimped toward the inner side to form an entirely sealed cell structure enclosing the electricity-generating element.

Figure 2:
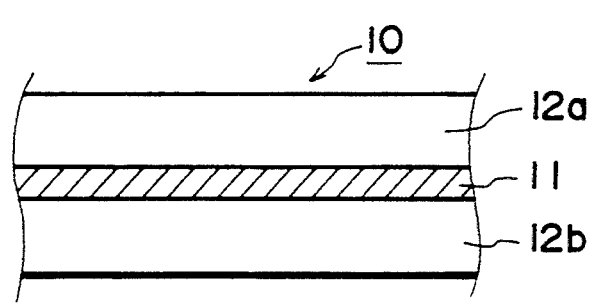
FIG. 2 is a partial sectional view of an electrode structure adopted in the secondary battery.

Herein, the positive electrode 1 or negative electrode 2 may be constituted by an electrode structure 10 having a sectional structure as partially shown in FIG. 2. More specifically, the electrode structure 10 includes an electroconductive substrate 11 comprising a foil or wire net of a metal, such as iron, stainless steel, steel, aluminum nickel or titanium and having a thickness of, e.g., 5–100 or 5–20 μm for a small-sized battery, and a composite electrode layer (12a, 12b) of, e.g., 10–1000 μm in thickness for a small-sized battery, on at least one surface, preferably on both surfaces as shown in FIG. 2, of the electroconductive substrate.

The composite electrode layers 12a and are respectively a layer comprising a particulate active substance, an electroconductive material such as electroconductive carbon, optionally included, and a binder comprising the vinylidene fluoride copolymer according to the present invention.

The active substance for constituting a positive electrode may preferably comprise a complex metal chalcogenide represented by a general formula: $LiMY_2$ (wherein M denotes at least one species of transition metals such as Co and Ni, and Y denotes a chalcogen such as O or S), particularly a complex metal oxide inclusive of $LiCoO_2$ as a representative. For constituting a negative electrode, the active substance may preferably comprise a carbonaceous substance, such as graphite, activated carbon, or a carbonized product formed by calcination of phenolic resin or pitch.

The electroconductive material may optionally be added for the purpose of increasing the electroconductivity of the composite electrode layer in case of using an active substance, such as $LiCoO_2$ showing a small electron conductivity. Examples thereof may include fine powders of carbonaceous substances such as carbon black and graphite, and metals such as nickel and aluminum. These electroconductive materials need not be included, e.g., when a carbonaceous substance showing a sufficient electroconductivity is used as the active substance.

As the binder does not contribute at all to the charge-discharge capacity of the battery so that the addition amount thereof should be reduced to the minimum. Accordingly, the binder is required to show a function of well holding the powder materials inclusive of the active substance and show an excellent adhesion to the electroconductive substrate even in a small amount thereof. The binder is generally electrically insulating so that the use thereof in an increased amount results in a larger internal resistance of the battery. Also from this viewpoint, the binder is required to exhibit its performances in as small an amount as possible.

Generally, the binder is used in a very small amount and more specifically at most 30 wt. % of the total composite electrode layer. In such a small amount, the binder cannot completely fill the voids between particles in the composite electrode layer or voids between the electroconductive substrate and the particles. On the other hand, in the case of a paint or a lining material containing fillers such as a pigment, the binder is used in an amount sufficient to fill the voids between the filler particles, so that there occurs little problem regarding the filler-holding performance of the binder. In the case of the electrode-forming binder, however, the binder is used in such a very small amount as described above and is required to show a performance of well holding the particulate active substance and an excellent adhesion to the electroconductive substrate.

The non-aqueous electrolytic solution impregnating the separator 3 may generally comprise a solution of an electrolyte, such as $LiClO_4$, $LiPF_6$ or $LiBF_4$ in a solvent, such as ethylene carbonate, propylene carbonate, dimethoxymethane, tetrahydrofuran or &C&-butyrolactone, which generally shows a strong dissolving power for a polymer. The binder is therefore required to be free from dissolution even dipped in such a solvent for a long period.

The vinylidene fluoride copolymer according to the present invention may preferably be used in the following manner in case of producing a thin electrode structure 10 for a battery.

The vinylidene fluoride copolymer having a carbonyl group content of $1 \times 10^{-5} - 5 \times 10^{-4}$ mol/g or a carbonate group content of $2 \times 10^{-5} - 6 \times 10^{-4}$ mol/g according to the present invention is dissolved in a solvent, such as N-methyl-2-pyrrolidone, N,N-dimethylformamide, N,N-dimethylacetamide or dimethylsulfoxide. Then, into the solution, particulate active substance and optional electroconductive material are added and dispersed to form an electrode-forming composition, which is then uniformly applied onto a metal foil or wire net of, e.g., ca. 5–20 µm in thickness, followed by drying and pressing to form a thin composite electrode layer (12a, 12b) of, e.g., around 100 µm in thickness, on the electroconductive substrate 11.

The weight ratio of the particulate component (active substance and optional electroconductive material) to the vinylidene fluoride copolymer may be generally ca. 80:20–98:2 and more specifically determined in consideration of the required performances of holding the particulate component, adhesion to the electroconductive substrate and electroconductivity of the electrode.

In the composite electrode layer formed on the electroconductive substrate according to the above-mentioned weight ratio, the vinylidene fluoride copolymer cannot completely fill the voids between the particulate components. However, if a solvent well dissolving the vinylidene fluoride copolymer is used, the copolymer can be uniformly dispersed and form a network structure within the composite electrode layer after drying, thus satisfactorily holding the particulate components.

The amount of solvent in the electrode-forming composition may be determined in consideration of the applicability onto the electroconductive substrate, film-forming characteristic after drying, etc., of the composition. Ordinarily, the vinylidene fluoride copolymer and the solvent may preferably be used in a weight ratio of 5:95–20:80.

The vinylidene fluoride copolymer may preferably be provided for use in the form of fine particles having an average particle size of at most 1000 µm, particularly 50–350 µm, so as to allow quick dissolution in the above-mentioned solvent.

As described above, the present invention provides a vinylidene fluoride copolymer showing a large adhesion onto a substrate of, e.g., a metal. Thus, vinylidene fluoride is copolymerized with a polar monomer selected from an unsaturated dibasic acid monoester and vinylene carbonate to introduce a functional group including a carboxyl group or a carbonate group into the resultant vinylidene fluoride-based resin to provide an improved adhesion to a substrate.

Further, by specifying the amount of the carbonyl group or carbonate group introduced into the resultant vinylidene fluoride copolymer, it has become possible to satisfy the requirement of both chemical resistance and the adhesiveness of the vinylidene fluoride copolymer.

Because of the excellent adhesion to a substrate of metals, plastics, glass, ceramics, wood, etc., and chemical resistance, the vinylidene fluoride copolymer according to the present invention can be extremely suitably used for various paints, lining materials and binders. It is particularly useful to use the copolymer as a binder for cell electrode production.

Hereinbelow, the present invention will be described more specifically based on Examples and Comparative Examples.

Incidentally, coke powder used as a cell active substance used in the following Examples and Comparative Examples was prepared by calcining pitch coke in nitrogen gas at 1000° C. for 1 hour and pulverized into an average diameter of ca. 10 µm, and activated carbon powder was obtained by pulverizing activated carbon into an average diameter of ca. 10 µm.

The carbonyl group content and carbonate group content of polymers were measured in the following manner.

Carbonyl Group Content

Several sample resins are prepared by mixing polyvinylidene fluoride resin and polymethyl methacrylate resin at various proportions and subjected to IR (infrared) spectroscopy. In the resultant IR spectra, the ratio of an absorption at 1726 cm$^{-1}$ to an absorption at 881 cm$^{-1}$ is measured and correlated with the carbonyl group content for each sample resin, to obtain a calibration curve of the absorption ratio versus the carbonyl group content.

A sample polymer is washed with hot water and subjected to extraction with benzene at 80° C. for 24 hours by using a Soxhlet extractor to remove unreacted monomers and homopolymers possibly remaining in the polymer. The sample polymer is then subjected to the measurement of a ratio of an absorption at 1747 cm$^{-1}$ attributable to carbonyl group to an absorption at 881 cm$^{-1}$, from which a carbonyl group content of the sample polymer is obtained based on the above-mentioned calibration curve.

Carbonate Group Content

A calibration curve is similarly obtained between a ratio of absorption at 1774 cm$^{-1}$ to absorption at 1402 cm$^{-1}$ and carbonate group content by using several samples obtained by mixing polyvinylidene fluoride resin and polycarbonate resin (bisphenol A-type).

A sample polymer is washed with hot water and subjected to extraction with benzene at 80° C. for 24 hours by using a Soxhlet extractor to remove unreacted monomers and homopolymers possibly remaining in the polymer. The sample polymer is then subjected to the measurement of a ratio of an absorption at 1830 cm$^{-1}$ attributable to carbonate group to an absorption at 1402 cm$^{-1}$, from which a carbonyl group content of the sample polymer is obtained based on the above-mentioned calibration curve.

EXAMPLE 1

Into a 2 liter-autoclave, 1040 g of deionized water, 0.8 g of methyl cellulose, 2.5 g of ethyl acetate, 4 g of diisopropyl peroxydicarbonate, 396 g of vinylidene fluoride and 4 g of maleic acid monomethyl ester were charged (vinylidene fluoride: maleic acid monomethyl ester=100:1.01), and subjected to suspension polymerization at 28° C. for 47 hours. After the polymerization, the polymerizate slurry was de-watered, washed with water and dried at 80° C. for 24 hours, to obtain polymer powder.

The polymerization rate was 90 wt. %, and the resultant polymer showed a solution viscosity of 1.1 and a carbonyl group content of $1.2 \times 10^{-4}$ mol/g.

10 g of the thus-obtained polymer powder was uniformly dissolved in 90 g of N-methyl-2-pyrrolidone, and 90 g of coke powder was added thereto, followed by stirring for mixing to obtain an electrode-forming composition. The composition was then uniformly applied onto a 10 μm-thick rolled copper foil (area: 100 mm×200 mm) so as to provide a dry layer thickness of 100 μm, and dried at 130° C. for 10 min. to form an electrode.

EXAMPLE 2

Into a 2 liter-autoclave, 1040 g of deionized water, 0.8 g of methyl cellulose, 4 g of diisopropyl peroxydicarbonate, 396 g of vinylidene fluoride and 4 g of citraconic acid monomethyl ester were charged (vinylidene fluoride: citraconic acid monomethyl ester=100:1.01), and subjected to suspension polymerization at 28° C. for 55 hours. After the polymerization, the polymerizate slurry was treated in the same manner as in Example 1 to obtain polymer powder.

The polymerization rate was 81 wt. %, and the resultant polymer showed a solution viscosity of 1.0 and a carbonyl group content of $1.1 \times 10^{-4}$ mol/g.

By using the polymer powder, an electrode was prepared in a similar manner as in Example 1.

EXAMPLE 3

Into a 2 liter-autoclave, 1075 g of deionized water, 0.2 g of methyl cellulose, 2 g of di-n-propyl peroxydicarbonate, 307 g of vinylidene fluoride and 9 g of vinylene carbonate were charged (vinylidene fluoride: vinylene carbonate=100:2.93), and subjected to suspension polymerization at 25° C. for 30 hours. After the polymerization, the polymerizate slurry was treated in the same manner as in Example 1, to obtain polymer powder.

The polymerization rate was 80 wt. %, and the resultant polymer showed a solution viscosity of 1.1 and a carbonate group content of $3.5 \times 10^{-4}$ mol/g.

By using the polymer powder, an electrode was prepared in a similar manner as in Example 1.

EXAMPLE 4

Into a 2 liter-autoclave, 1040 g of deionized water, 0.8 g of methyl cellulose, 1.2 g of ethyl acetate, 4 g of diisopropyl peroxydicarbonate, 393 g of vinylidene fluoride and 7 g of maleic acid monomethyl ester were charged (vinylidene fluoride: maleic acid monomethyl ester=100:1.78), and subjected to suspension polymerization at 31° C. for 55 hours. After the polymerization, the polymerizate slurry was treated in the same manner as in Example 1 to obtain polymer powder.

The polymerization rate was 86 wt. %, and the resultant polymer showed a solution viscosity of 1.0 and a carbonyl group content of $2.5 \times 10^{-4}$ mol/g.

10 g Of the thus-obtained polymer powder was uniformly dissolved in 90 g of N,N-dimethylformamide, and 90 g of activated carbon powder was added thereto, followed by stirring for mixing to obtain an electrode-forming composition. The composition was then uniformly applied onto a 10 n-thick rolled copper foil (area: 100 mm×200 mm) so as to provide a dry layer thickness of 100 μm, and dried at 110° C. for 10 min. to form an electrode.

COMPARATIVE EXAMPLE 1

Into a 2 liter-autoclave, 1040 g of deionized water, 0.4 g of methyl cellulose, 8 g of ethyl acetate, 2 g of n-propyl peroxydicarbonate and 400 g of vinylidene fluoride were charged and subjected to suspension polymerization at 25° C. for 22 hours. After the polymerization, the polymerizate slurry was treated in the same manner as in Example 1 to obtain polymer powder.

The polymerization rate was 85 wt. %, and the resultant polymer showed a solution viscosity of 1.1.

By using the polymer powder, an electrode was prepared in a similar manner as in Example 1.

COMPARATIVE EXAMPLE 2

Into a 2 liter-autoclave, 1040 g of deionized water, 0.8 g of methyl cellulose, 3 g of ethyl acetate, 4 g of diisopropyl peroxydicarbonate, 396 g of vinylidene fluoride and 4 g of maleic anhydride were charged (vinylidene fluoride: maleic anhydride=100:1.01), and subjected to suspension polymerization at 28° C. for 22 hours. After the polymerization, the polymerizate slurry was treated in the same manner as in Example 1 to obtain polymer powder.

The polymerization rate was 88 wt. %, and the resultant polymer showed a solution viscosity of 1.4 and a carbonyl group content of zero, thus showing that the maleic anhydride was not copolymerized.

By using the polymer powder, an electrode was prepared in a similar manner as in Example 1.

COMPARATIVE EXAMPLE 3

Into a 2 liter-autoclave, 1040 g of deionized water, 0.4 g of methyl cellulose, 4 g of ethyl acetate, 4 g of diisopropyl peroxydicarbonate, 388 g of vinylidene fluoride and 12 g of crotonic acid were charged (vinylidene fluoride: crotonic acid=100:3.09), and subjected to suspension polymerization at 28° C. for 47 hours. After the polymerization, the polymerizate slurry was treated in the same manner as in Example 1, to obtain polymer powder.

The polymerization rate was as very low as 12 wt. %.

COMPARATIVE EXAMPLE 4

Into a 2 liter-autoclave, 1040 g of deionized water, 0.5 g of methyl cellulose, 4 g of ethyl acetate, 4 g of diisopropyl peroxydicarbonate, 380 g of vinylidene fluoride and 8 g of dimethylacrylamide were charged (vinylidene fluoride: dimethylacrylamide=100:2.11), and subjected to suspension polymerization at 28° C. for 20 hours. After the polymerization, the polymerizate slurry was treated in the same manner as in Example 1 to obtain polymer powder.

The polymerization rate was 92 wt. %, and the resultant polymer showed a solution viscosity of 1.3.

By using the polymer powder, an electrode was prepared in a similar manner as in Example 1.

COMPARATIVE EXAMPLE 5

Into a 2 liter-autoclave, 1040 g of deionized water, 0.8 g of methyl cellulose, 2.5 g of ethyl acetate, 4 g of diisopropyl peroxydicarbonate, 384 g of vinylidene fluoride and 16 g of maleic acid monomethyl ester were charged (vinylidene fluoride: maleic acid monomethyl ester=100:4.17), and subjected to suspension polymerization at 31° C. for 54 hours. After the polymerization, the polymerizate slurry was treated in the same manner as in Example 1 to obtain polymer powder.

The polymerization rate was as low as 32 wt. %, and the resultant polymer showed a solution viscosity of 0.5 and a carbonyl group content of $7.2 \times 10^{-4}$ mol/g.

By using the polymer powder, an electrode was prepared in a similar manner as in Example 1.

The respective electrodes thus obtained were dipped in an electrolytic solution (propylene carbonate/dimethoxyethane=1/1 by weight) at 50° C. for 1 week. Then, the adhesion of the composite electrode layer to the copper foil before and after the dipping was measured as a peeling strength by a 180 degree-peeling test according to JIS K6854. The results are shown in Table 1 together with the species and charged ratio of the comonomer used in combination with vinylidene fluoride for providing the binder copolymer.

TABLE 1

| | Comonomer (charged ratio*) | | Peeling strength (g/mm) | |
|---|---|---|---|---|
| | | | Before dipping | After dipping |
| Example | | | | |
| 1 | monomethyl maleate | (1.01) | 16 | 15 |
| 2 | monomethyl citraconate | (1.01) | 14 | 14 |
| 3 | vinylene carbonate | (2.93) | 11 | 10 |
| 4 | monomethyl maleate | (1.78) | 14 | 12 |
| Comp. Ex. | | | | |
| 1 | — | (0) | 4 | 3 |
| 2 | maleic anhydride | (1.01) | 4 | 4 |
| 4 | dimethyl-acrylamide | (2.11) | 2 | — |
| 5 | monomethyl maleate | (4.17) | 7 | 3 |

*The numerical values in the parentheses represent, the weight parts, as charged, of the comonomers per 100 wt. parts of vinylidene fluoride.

What is claimed is:

1. A vinylidene fluoride copolymer, comprising:
   (a) a major amount of a monomer comprising 100–80 wt. % of vinylidene fluoride and 0–20 wt. % of another monomer copolymerizable with the vinylidene fluoride, and
   (b) a minor amount effective to improve the adhesion of the vinylidene fluoride copolymer to a substrate of an unsaturated dibasic acid monoester polar monomer;

said vinylidene fluoride copolymer having a carbonyl group content of $1 \times 10^{6} - 5 \times 10^{4}$ mol/g.

2. A vinylidene fluoride copolymer according to claim 1, wherein said polar monomer comprises at least one unsaturated dibasic acid monoester selected from the group consisting of maleic acid monoesters and citraconic acid monoesters.

3. A vinylidene fluoride copolymer according to claim 2, wherein said polar monomer comprises at least one unsaturated dibasic acid monoester selected from the group consisting of maleic acid monomethyl ester and citraconic acid monomethyl ester.

4. A vinylidene fluoride copolymer obtained by copolymerizing (a) 100 wt. parts of a monomer comprising 100–80 wt. % of vinylidene fluoride and another monomer copolymerizable with the vinylidene fluoride, and (b) a polar monomer selected from 0.1–3 wt. parts of a dibasic acid monoester and 0.1–5 wt. parts of vinylene carbonate.

5. A vinylidene fluoride copolymer according to claim 4, wherein the copolymerization is performed in an aqueous medium.

6. A vinylidene fluoride copolymer according to claim 5, wherein the copolymerization is performed by suspension polymerization.

7. A binder solution composition, comprising: a vinylidene fluoride copolymer according to any of claims 1, 2, 4, 5 and 6 and a solvent capable of dissolving the vinylidene fluoride copolymer.

8. An electrode-forming composition for a non-aqueous electrolyte secondary battery, comprising:
   a vinylidene fluoride copolymer according to any of claims 1, 2, 4, 5 and 6,
   a solvent capable of dissolving the vinylidene fluoride copolymer, and
   a particulate active substance, or a particulate active substance and an electroconductive material.

9. An electrode structure for a non-aqueous electrolyte secondary battery, comprising: an electroconductive substrate and a composite electrode layer disposed on at least one surface of the electroconductive substrate; said composite electrode layer comprising
   a particulate active substance, or a particulate active substance and an electroconductive material, and
   a binder comprising a vinylidene fluoride copolymer according to any of claims 1, 2, 3, 4, 5 and 6.

10. A non-aqueous electrolyte secondary battery, comprising, a positive electrode, a negative electrode, and a separator and a non-aqueous electrolytic solution disposed between the positive and negative electrodes;
    at least one of said positive and negative electrodes comprising an electrode structure according to claim 9.

* * * * *

UNITED STATES PATENT AND TRADEMARK OFFICE
CERTIFICATE OF CORRECTION

PATENT NO. : 5,415,958
DATED : May 16, 1995
INVENTOR(S) : Yosuke Takahashi et al.

It is certified that error appears in the above-indentified patent and that said Letters Patent is hereby corrected as shown below:

Claim 1 column 11, line 46, change "$1 \times 10^6 - 5 \times 10^4$ mol/g" to --$1 \times 10^{-5} - 5 \times 10^{-4}$ mol/g--.

Signed and Sealed this

Fourteenth Day of November, 1995

Attest:

BRUCE LEHMAN

*Attesting Officer*   *Commissioner of Patents and Trademarks*